United States Defensive Publication [19] (H) [11] T970,002

Kidder et al. [43] May 2, 1978

[54] CUTTING ELEMENTS FOR DRILL BITS

[75] Inventors: Harry E. Kidder, Rolling Hills; Robert F. Evans, La Habra, both of Calif.

[73] Assignee: Smith International, Inc., Newport Beach, Calif.

[21] Appl. No.: 833,480

[22] Filed: Sep. 15, 1977

Related U.S. Application Data

[63] Continuation of Ser. No. 737,328, Nov. 1, 1976, abandoned.

[51] Int. Cl.[2] ..... B23P 3/26; E21B 9/36; E21C 13/01; E21C 13/02

[52] U.S. Cl. ..... 175/374; 175/371; 175/410

[57] ABSTRACT

A cutting element for mounting in a rolling cone cutter of a rock drill bit has a notch in the periphery of its base for improved retention of the cutting element in the rolling cone cutter. The longitudinal axis of the notch is essentially transverse to the direction of insertion of the cutting element into the rolling cone cutter. To maximize the effectiveness of the notch in improving retention of the cutting element, preferably the notch is sharp lipped.

7 Claims, 1 Sheet Drawing,

23 Pages Specification

The file of this unexamined application may be inspected and copies thereof may be purchased (849 O.G. 1221, Apr. 9, 1968).

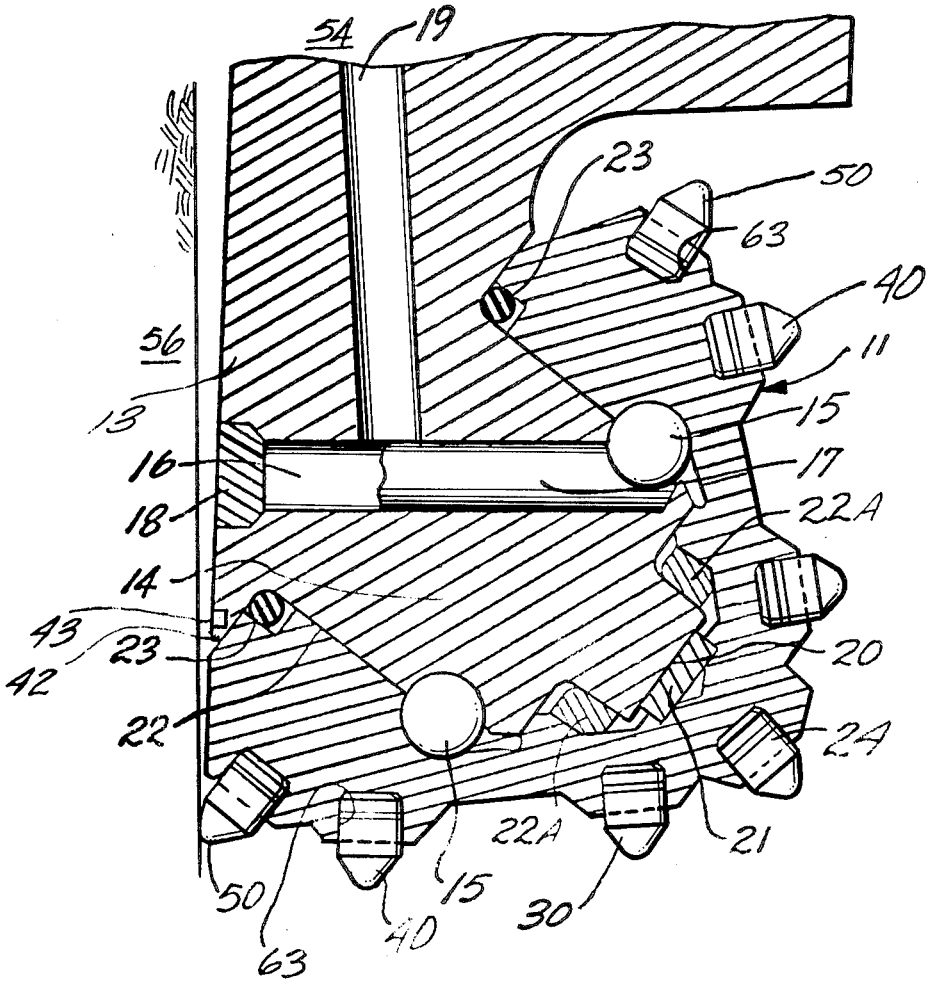

Fig. 1
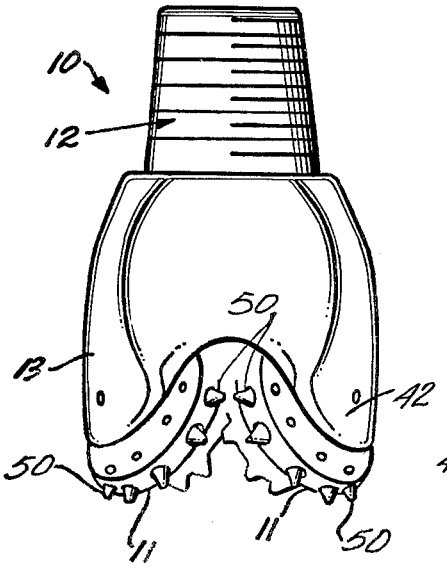
Fig. 2
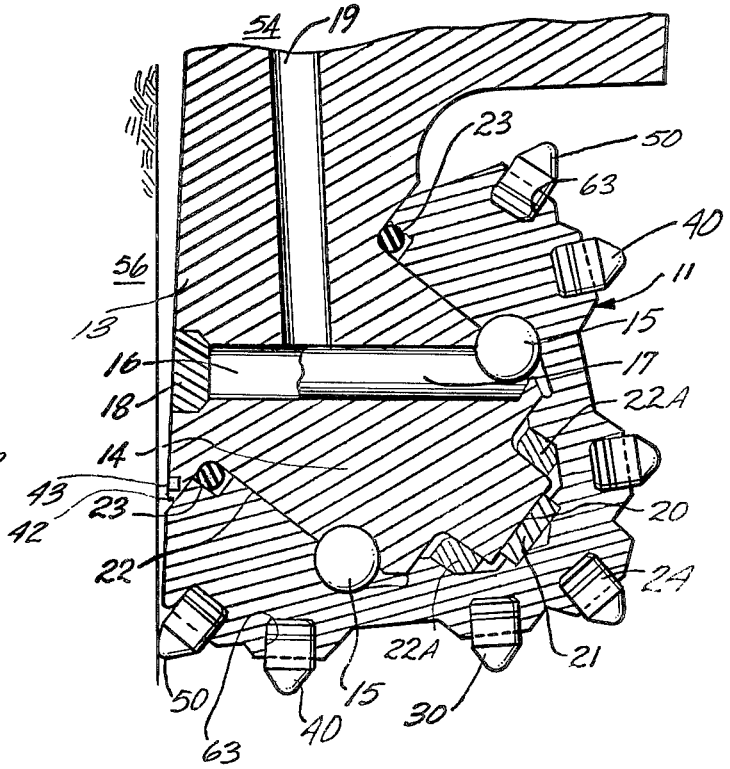
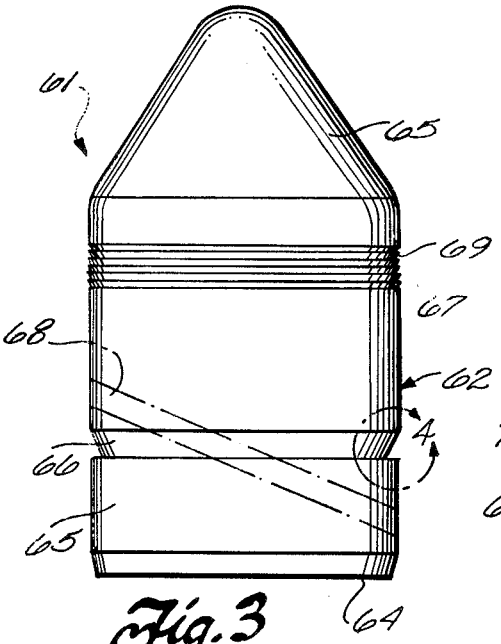
Fig. 3
Fig. 6
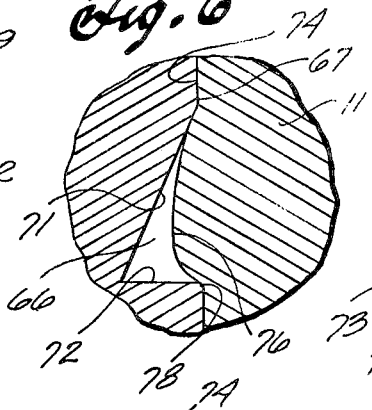
Fig. 5
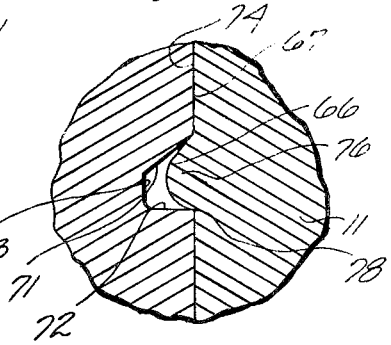
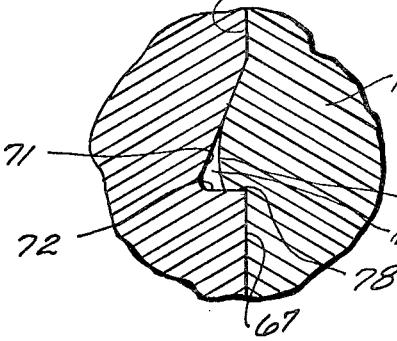
Fig. 4